United States Patent
Buck et al.

(10) Patent No.: US 10,794,341 B2
(45) Date of Patent: Oct. 6, 2020

(54) DEVICE FOR LOWERING FLOW NOISES

(71) Applicants: Umfotec GmbH, Northeim (DE); Dietrich Denker, Ostfildern (DE)

(72) Inventors: Ralf Buck, Kipfenberg/Schelldorf (DE); Michael Heuer, Kassel (DE); Dirk Nagel, Dassel (DE); Philipp Troeger, Hannover (DE); Norbert Luebbe, Roedinghausen (DE)

(73) Assignees: UMFOTEC GMBH (DE); Dietrich Denker (DE)

( * ) Notice: Subject to any disclaimer, the term of this patent is extended or adjusted under 35 U.S.C. 154(b) by 298 days.

(21) Appl. No.: 15/749,229

(22) PCT Filed: Jul. 29, 2016

(86) PCT No.: PCT/EP2016/068159
§ 371 (c)(1),
(2) Date: Jan. 31, 2018

(87) PCT Pub. No.: WO2017/021298
PCT Pub. Date: Feb. 9, 2017

(65) Prior Publication Data
US 2018/0223779 A1    Aug. 9, 2018

(30) Foreign Application Priority Data
Aug. 3, 2015  (DE) .......... 10 2015 112 717

(51) Int. Cl.
*F02M 35/12*    (2006.01)
*F02M 35/10*    (2006.01)
(Continued)

(52) U.S. Cl.
CPC .. *F02M 35/1283* (2013.01); *F02M 35/10144* (2013.01); *F02M 35/10157* (2013.01);
(Continued)

(58) Field of Classification Search
CPC .......... F02M 35/12; F02M 35/1255; F02M 35/1266; F02M 35/1283; F02M 35/1288;
(Continued)

(56) References Cited

U.S. PATENT DOCUMENTS 1,609,283 A    12/1926  Bailey
4,193,605 A *  3/1980  Josephson ............. F16K 1/2261
                                                    277/642
(Continued)

FOREIGN PATENT DOCUMENTS

CN    104776279    7/2015
DE    1 978 062    2/1968
(Continued)

OTHER PUBLICATIONS

Translation on International Preliminary Report for Application No. PCT/EP2016/068159 dated Feb. 6, 2018.
(Continued)

*Primary Examiner* — Edgardo San Martin
(74) *Attorney, Agent, or Firm* — Gerald E. Hespos; Michael J. Porco; Matthew T. Hespos

(57) ABSTRACT

A device (1) for lowering flow noises has opposed first and second connection pieces (2, 3), and outer and inner sleeves (4, 5) between the connection pieces. A radial collar (6) is between the sleeves (4, 5) and forms separated volume chambers. Openings (11) in the inner sleeve (5) connect the volume chambers to a line space (13) enclosed by the inner sleeve (5). A sealing ring (15) at the free end (14) of the collar (6) defines a ring cap with a lateral surface (21) that reaches over the collar (6) and seals against the sleeve (4, 5) adjacent the free end (14) of the collar (6) and that has a surface (23, 26) that seals against either an end face (25) of the collar (6) or a side surface (28) of the collar (6) extending parallel to the radial collar (6).

12 Claims, 8 Drawing Sheets

(51) Int. Cl.
| | |
|---|---|
| *F16L 55/02* | (2006.01) |
| *F16L 55/033* | (2006.01) |
| *F16L 55/027* | (2006.01) |
| *F16J 15/10* | (2006.01) |
| *F01N 1/02* | (2006.01) |
| *F16J 15/02* | (2006.01) |
| *F16J 15/08* | (2006.01) |

(52) U.S. Cl.
CPC .. *F02M 35/10295* (2013.01); *F02M 35/1266* (2013.01); *F16J 15/102* (2013.01); *F16J 15/104* (2013.01); *F16L 55/02781* (2013.01); *F16L 55/033* (2013.01); *F16J 15/022* (2013.01); *F16J 15/0893* (2013.01); *Y02T 10/144* (2013.01)

(58) Field of Classification Search
CPC ....... F02M 35/10144; F02M 35/10157; F02M 35/1233; F16L 55/02; F16L 55/033; F16L 55/02781; F01N 1/02; F01N 1/026; G10K 11/16; G10K 11/161; G10K 11/172
See application file for complete search history.

(56) References Cited

U.S. PATENT DOCUMENTS

| | | | |
|---|---|---|---|
| 4,327,817 A | 5/1982 | Scarton et al. | |
| 4,781,961 A * | 11/1988 | Weaver | E06B 7/084 |
| | | | 428/122 |
| 5,566,954 A * | 10/1996 | Hahn | F16J 15/025 |
| | | | 123/41.49 |
| 5,997,009 A * | 12/1999 | Geise | A47K 3/008 |
| | | | 277/650 |
| 6,135,418 A | 10/2000 | Hatton | |
| 6,220,605 B1 * | 4/2001 | Becker, Jr. | F16L 37/04 |
| | | | 277/591 |
| 6,748,915 B2 * | 6/2004 | Cole | F02M 35/1255 |
| | | | 123/184.53 |
| 7,367,424 B2 * | 5/2008 | Brown | B64D 41/00 |
| | | | 181/249 |
| 7,431,126 B2 * | 10/2008 | Williams | B64D 41/00 |
| | | | 181/214 |
| 7,934,581 B2 * | 5/2011 | Kim | F04D 29/665 |
| | | | 181/250 |
| 8,221,074 B2 * | 7/2012 | Nelson | F04D 29/646 |
| | | | 415/213.1 |
| 8,714,522 B2 * | 5/2014 | Hasegawa | F02D 9/1015 |
| | | | 123/337 |
| 9,273,698 B2 * | 3/2016 | Murador | F04D 29/646 |
| 9,624,838 B2 * | 4/2017 | Oiwa | F02B 27/0215 |
| 9,625,077 B2 * | 4/2017 | Barbolini | F16L 55/033 |
| 2013/0263823 A1 * | 10/2013 | Denker | F02K 1/827 |
| | | | 123/434 |

FOREIGN PATENT DOCUMENTS

| | | |
|---|---|---|
| DE | 10 2004 034 591 | 2/2006 |
| DE | 600 19 179 | 3/2006 |
| DE | 10 2004 049 446 | 4/2006 |
| DE | 10 2013 015 144 | 4/2015 |
| DE | 20 2015 102 914 | 7/2015 |
| EP | 2 256 330 | 12/2010 |
| GB | 2 389 150 | 12/2003 |

OTHER PUBLICATIONS

Pneumatic-seals, Parker Hannifin Corp., 2012.
International Search Report dated Oct. 20, 2016.

* cited by examiner

DEVICE FOR LOWERING FLOW NOISES

BACKGROUND

Field of the Invention

The invention relates to a device for lowering flow noises, comprising a first connection piece, a second connection piece facing away from the first connection piece, an outer sleeve arranged between the first connection piece and the second connection piece, and an inner sleeve arranged between the connection pieces, wherein at least two volume chambers separated from each other by at least one peripherally extending radial collar are arranged between the inner sleeve and the outer sleeve, which volume chambers are connected to the line space enclosed by the inner sleeve by means of openings in the wall of the inner sleeve, wherein the radial collar has a sealing ring at the free end of the radial collar.

Description of the Related Art

When exhaust gas turbochargers, for example, are used in conjunction with internal combustion engines, undesirable flow noises result due to high engine speeds, unmanageable imbalances, disruptions due to production-related warping (e.g. vanes) as well as increased air mass throughput. These flow-generated noises are lowered across a broad spectrum by appropriate devices or dampers. The devices or dampers are arranged, among other things, between the turbocharger and the internal combustion engine or between the turbocharger and an air cooler arranged upstream of the internal combustion engine.

One such device for lowering flow noises is known from DE 10 2004 049 446 A1, for example. The known device has an outer sleeve arranged between an inlet piece and an outlet piece, as well as an inner sleeve arranged between the inlet piece and the outlet piece. Two volume chambers (resonance chambers) separated from each other by a peripherally extending radial collar on the outer sleeve are arranged between the inner sleeve and the outer sleeve and are connected to the line space, which is enclosed by the inner sleeve, by means of openings in the wall of the inner sleeve.

With regard to the known device, which has essentially proven effective, it is disadvantageous that the collar separating the chambers does not provide adequate separation or sealing, depending on existing tolerances, and as a result undesirable frequency changes and/or changes in the damping characteristics can occur.

A device for lowering flow noises, comprising a first connection piece, a second connection piece facing away from the first connection piece, an outer sleeve arranged between the first connection piece and the second connection piece, and an inner sleeve arranged between the connection pieces is known from GB 2 389 150 A. At least two volume chambers separated from each other by at least one peripherally extending radial collar are arranged between the inner sleeve and the outer sleeve, which volume chambers are connected to the line space enclosed by the inner sleeve by means of openings in the wall of the inner sleeve. At its free end, the radial collar has a sealing ring configured as an O-ring made of an elastomer.

With regard to this known device, especially when different materials with different coefficients of expansion are used for the outer sleeve and the inner sleeve, and due to existing tolerances, it is disadvantageous that the radial collar with its free end, fails to adequately separate or seal the chambers it subdivides, even when an O-ring seal is arranged between the collar and the adjacent sleeve, thereby enabling the occurrence of undesired frequency changes and/or changes to the damping characteristics.

Additionally, a device for lowering flow noises is known from EP 2 256 330 B1. The known device also has an outer sleeve arranged between an inlet piece and an outlet piece as well as an inner sleeve arranged between the inlet piece and outlet piece. It also has two volume chambers (resonance chambers) arranged between the inner sleeve and the outer sleeve, these chambers being separated from each other by a radially extending peripheral collar in the inner sleeve, and said chambers are connected by means of slits in the wall of the inner sleeve to the line space enclosed by the inner sleeve.

With regard to this known device as well, it is disadvantageous that, depending on existing tolerances, the collar separating the chambers from each other fails to sufficiently separate or seal them, thereby enabling the occurrence of undesirable frequency changes and/or changes in the damping characteristics.

The present invention seeks to solve the problem of improving the known devices such that the collar which is arranged between the inner sleeve and outer sleeve in order to separate the chambers from each other adequately separates and reliably seals said chambers while better balancing out existing tolerances, also when the sleeves are made of different materials that have different coefficients of expansion.

SUMMARY

A device for lowering flow noises in accordance with the invention has a first connection piece, a second connection piece facing away from the first connection piece. An outer sleeve and an inner sleeve are arranged between the first connection piece and the second connection piece. At least one peripherally extending radial collar is arranged between the inner sleeve and the outer sleeve and defines at least two volume chambers that are separated from each other by the at least one radial collar. Openings are formed in a wall of the inner sleeve and connect the volume chambers to a space enclosed by the inner sleeve. A sealing ring is at a free end of the radial collar. The sealing ring is designed as a ring cap, which reaches over the collar and which on the one hand lies in a sealing manner against a wall surface of the sleeve adjacent to the free end of the collar by means of a peripherally extending outer lateral surface of the ring cap and on the other hand lies in a sealing manner against the end face of the free end of the collar by means of the inner lateral surface of the sealing ring facing away from the outer lateral surface, or it lies in a sealing manner against the side surface of the collar facing the ring cap by means of an annular radial contact surface extending parallel to the radial collar.

By designing the sealing ring as a ring cap that reaches over the collar, said cap having on the one hand an outer lateral surface that lies in a sealing manner against the wall surface of the adjacent sleeve (the outer sleeve or inner sleeve, depending on the arrangement of the collar), and on the other hand said cap having an inner lateral surface facing away from the outer lateral surface, and lying in a sealing manner against the end face of the free end of the collar, it is possible to bridge a relatively large intermediate space between the free end of the radial collar and the adjacent sleeve with a reliable sealing effect. Alternatively, the ring cap, on the one hand, can lie in a sealing manner with its outer lateral surface against the wall surface of the adjacent sleeve and, on the other hand, it can lie in a sealing manner, with an annular radial contact surface extending parallel to the radial collar, against the radially arranged side surface of the collar facing toward the ring cap. With the alternative solution, an even larger intermediate space between the free end of the radial collar and the adjacent sleeve can be bridged with a reliable sealing effect.

The sealing ring may have elastic properties. The sealing ring therefore constitutes an elastic equalizing element that balances out the differing expansions of different materials that have different coefficients of thermal expansion, and it also reliably seals the volume chambers.

In one embodiment, the sealing ring with its outer lateral surface lies under tension in a sealing manner against the wall surface of the sleeve adjacent to the free end of the collar, and the sealing ring with its inner lateral surface facing away from the outer lateral surface lies, also under tension in a sealing manner, against the peripherally extending end face of the free end of the collar. The sealing ring can thus abut, with its annular radial contact surface extending parallel to the radial collar, against the radially arranged lateral surface of the collar facing toward the ring cap. Thanks to their relatively simple geometric shape, both the radial collar as well as the sealing ring can thus be produced and mounted relatively easily and inexpensively.

The cap-shaped design of the sealing ring allows the collar to be configured as a simple peripheral wall in the radial direction. Moreover, the sealing ring can be relatively easily and reliably placed on the collar and the sleeves can be pushed inside each other without displacing the sealing ring. The cap-shaped design additionally has the advantage of allowing the wall thickness of the peripherally extending collar to be relatively thin. In turn, this means that the length of two adjacent volume chambers can be reduced or, if they remain the same length, the volume of the volume chambers can be enlarged.

The sealing ring may be constructed from a wire mesh. Constructing the sealing ring from wire mesh results in the desirable elastic properties. In addition, a wire mesh has high temperature resistance and good damping characteristics. However, the sealing ring can also be constructed from a silicate fiber mesh or a compound mesh made of wire and silicate fibers.

The outer lateral surface of the sealing ring may lie under tension and in a sealing manner, against the wall surface of the sleeve adjacent to the free end of the collar, and the sealing ring, with the annular radial contact surface extending parallel to the radial collar, lies under tension also in a sealing manner against the lateral surface of the collar facing toward the ring cap. As described above, this makes it possible to bridge a relatively large intermediate space between the free end of the radial collar and the adjacent sleeve with a reliable sealing effect.

In one embodiment of the invention, the sealing ring has at its jacket formed by the lateral faces, namely at the end facing away from the contact surface, a plurality of clamp profiles which, when mounted, lie under tension against the second side surface of the collar facing away from the side surface and by means of which the contact surface of the ring cap is tensioned with corresponding tension against the side surface facing toward the contact surface.

The clamp profiles may pull the radial contact surface of the sealing ring under tension against the adjacent side surface, while the outer lateral surface of the sealing ring is simultaneously tensioned against the wall surface of the sleeve adjacent to the free end of the collar.

The sealing ring may be constructed from a resilient metal, especially a resilient stainless steel. Constructing the sealing ring from a resilient metal, especially stainless steel, also results in the desired elastic properties. In addition, the stainless steel also has high temperature resistance. The sealing ring made of spring steel also has a relatively low wall thickness with a correspondingly low volume, which favorably affects the size of the volume chambers.

The peripherally extending radial collar may be arranged securely with its fixed end facing away from the free end, at the inner sleeve and with its free end it is sealed vis-à-vis the outer sleeve by means of the sealing ring.

The peripherally extending radial collar may be arranged securely with its fixed end facing away from the free end, at the outer sleeve and with its free end it is sealed vis-à-vis the inner sleeve by means of the sealing ring.

The sleeve that is connected to the fixed end of the collar and the collar itself may be made of plastic.

The sleeve that is not connected to the fixed end of the collar may be constructed from metal or aluminum.

Additional features and advantages of the invention are evident from the following special description and the drawings.

BRIEF DESCRIPTION OF THE DRAWINGS

FIG. 5 an enlarged view of the sealing ring from FIG. 1 along the line V-V from

DETAILED DESCRIPTION

Figure 1:
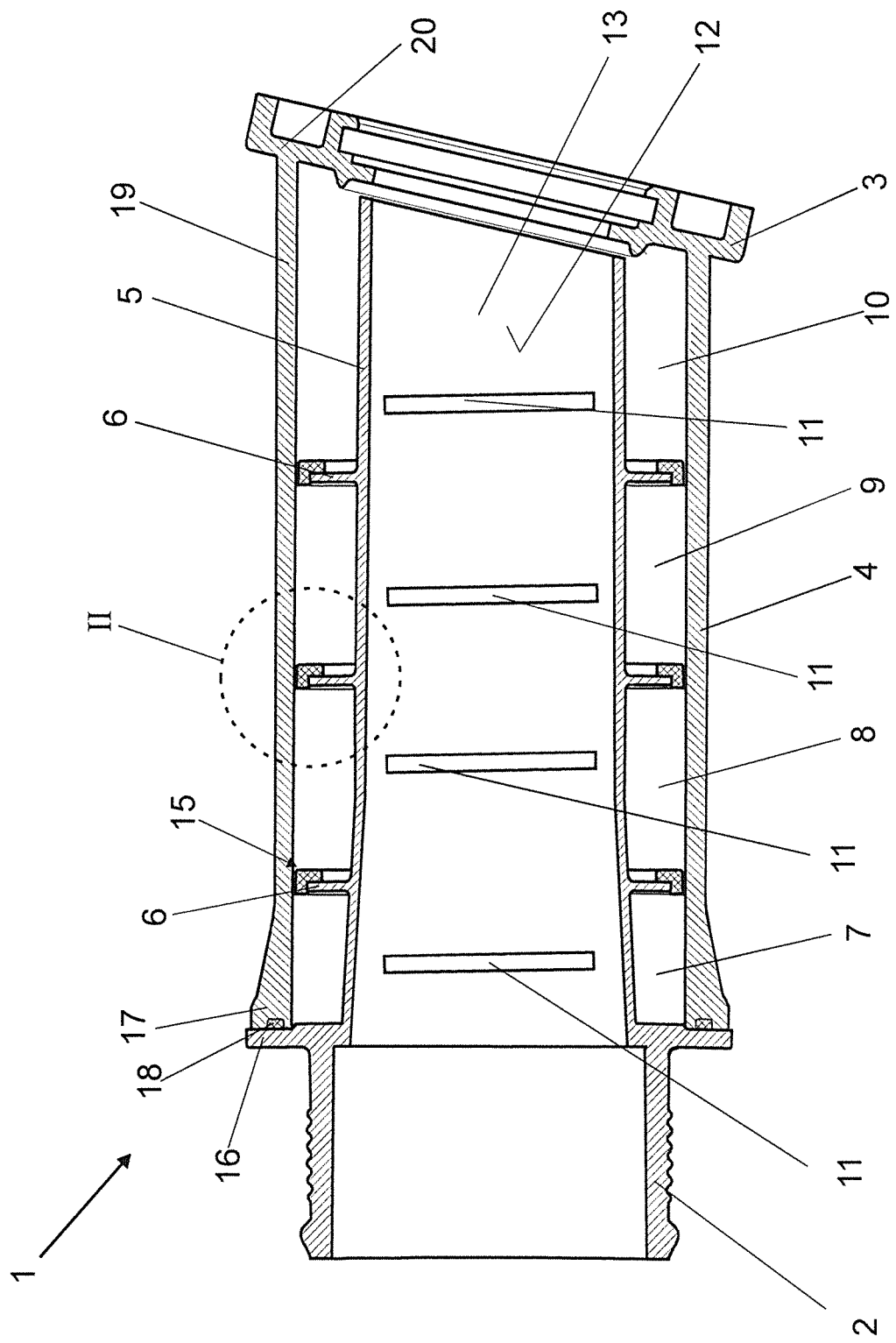
FIG. 1 a lateral cross-sectional view of a device for lowering flow noises, having an outer sleeve and an inner sleeve, with integrally molded collars and with sealing rings made of a wire mesh that reach over the respective collar as a ring cap.

A device 1 for lowering flow noises (silencer) essentially comprises a first connection piece 2, a second connection piece 3, an outer sleeve 4 and an inner sleeve 5.

In the exemplary embodiments, the outer sleeve 4 and the inner sleeve 5 are arranged concentrically with respect to each other and between the first connection piece 2 and the second connection piece 3. In particular, the outer sleeve 4 can differ from the circular shape and can, for example, be constructed from two half shells (not shown). Between the inner sleeve 5 and the outer sleeve 4, in each case two adjacent volume chambers 7, 8, 9, 10 separated from each other by a peripherally extending radial collar 6 are arranged, said volume chambers being connected to the line space 13, which is enclosed by the inner sleeve 5, by means of openings 11 in the wall 12 of the inner sleeve 5. In the exemplary embodiments, the openings 11 are shown as slits. However, they can also be configured as holes, for example.

The first connection piece 2 forms an inlet piece and the second connection piece 3 forms an outlet piece. In principle, the first connection piece 2 can also form the outlet piece, and the second connection piece 3 can form the inlet piece.

According to the exemplary embodiment in FIG. 1, the peripherally extending radial collar 6 is securely arranged at the inner sleeve 5, by being integrally molded thereon, for example, and has at its free end 14 a sealing ring 15 made of a wire mesh for sealing against the outer sleeve 4. The first connection piece 2 has at its end facing toward the second connection piece 3 a side wall 16 that laterally delimits the first volume chamber 7 from the first connection piece 2, i.e. in the longitudinal direction, and in the exemplary embodiment it is connected to the inner sleeve 5 (although this is not obligatory). With its first end 17 facing toward the first connection piece 2, the outer sleeve 4 lies against the side wall 16 of the connection piece 2. According to the exemplary embodiment from FIG. 1, a seal 18 made of an elastomer is arranged in a groove ahead of the side wall 16 in the direction of the first end 17. The second connection piece 3 has, at the second end 19 of the outer sleeve 4 facing away from the first connection piece 2, a side wall 20 that delimits the volume chamber 10 laterally toward the second connection piece 3, i.e. in the longitudinal direction, and in the exemplary embodiment it is connected to the outer sleeve 4 (although this is not obligatory).

Figure 2:
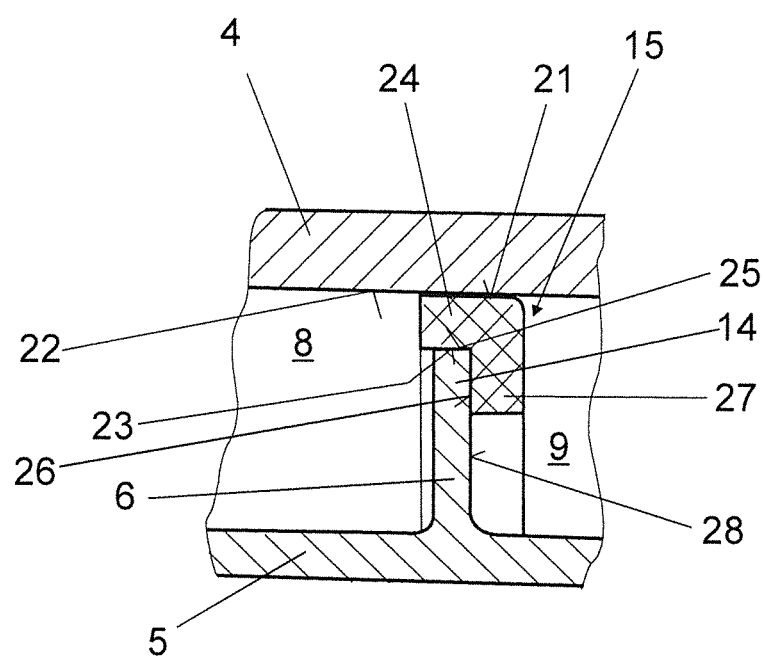
FIG. 2 an enlarged view of Detail II from FIG. 1.
Figure 6:
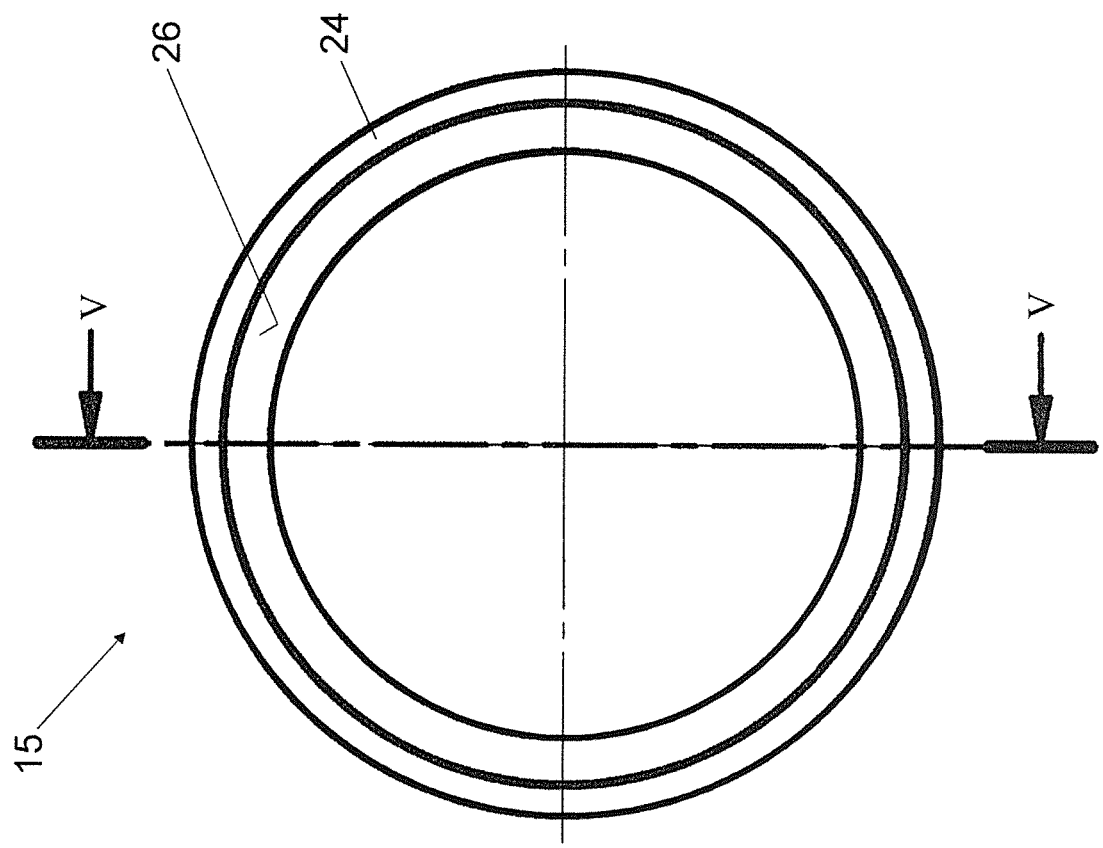
FIG. 6 a frontal view of the sealing ring from FIG. 5 as seen from direction VI.
Figure 5:
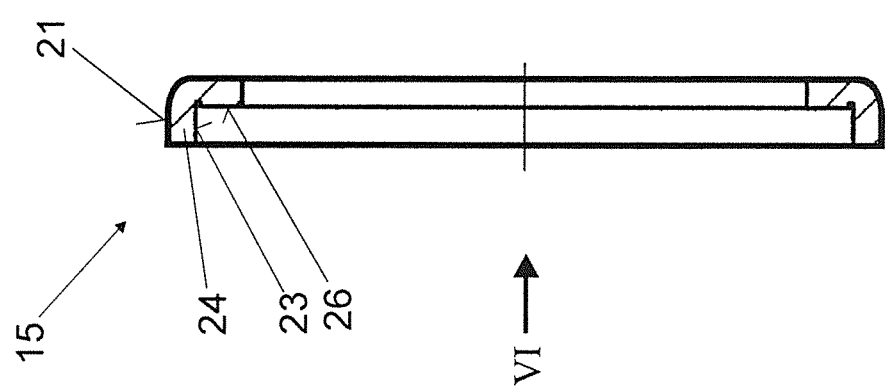
Figure 7:
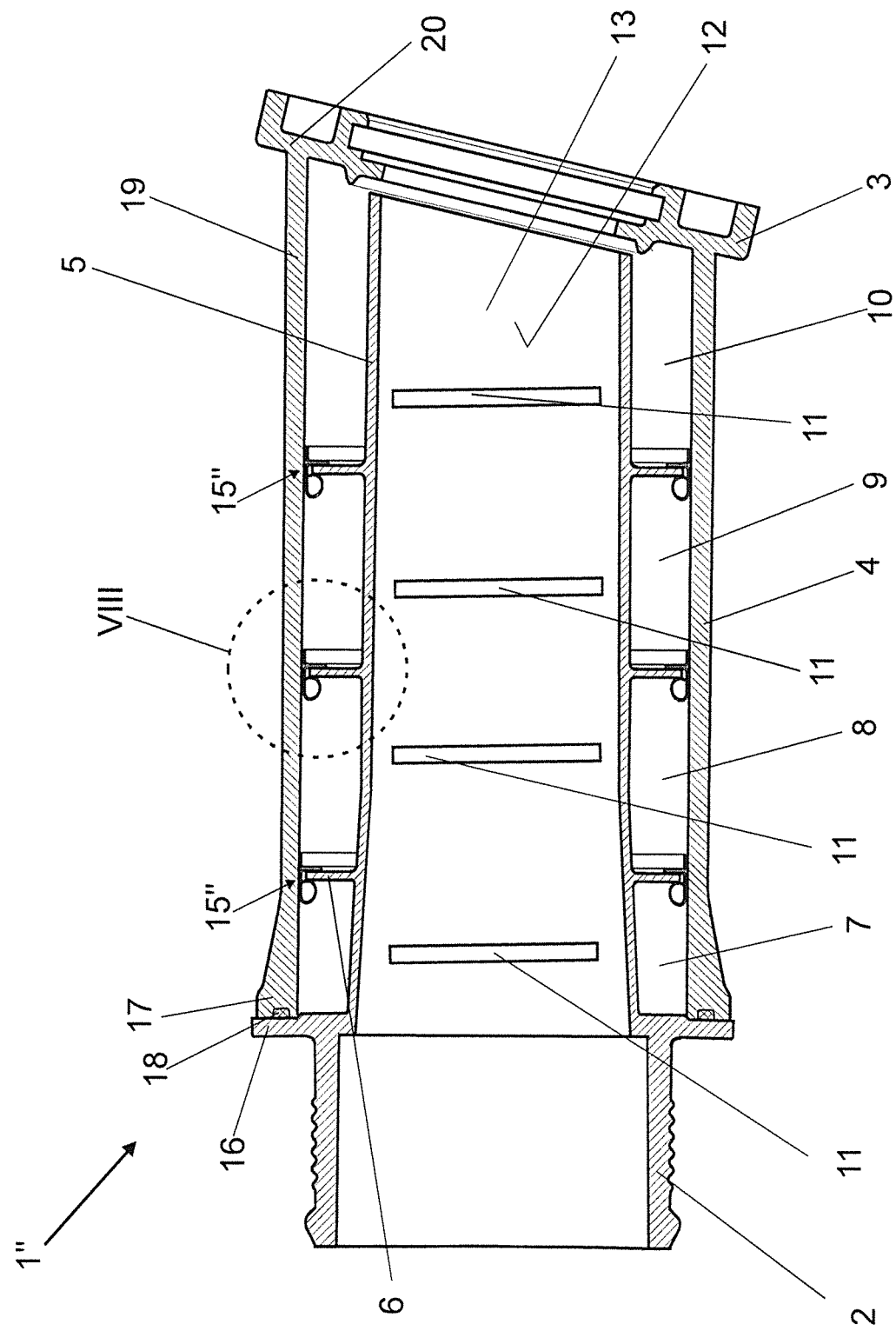
FIG. 7 a cross-sectional lateral view of an additional device for lowering flow noises, having an outer sleeve and an inner sleeve with integrally molded collars and with sealing rings made of a resilient stainless steel that reach over the respective collar as a ring cap and which have a plurality of clamp profiles.
Figure 8:
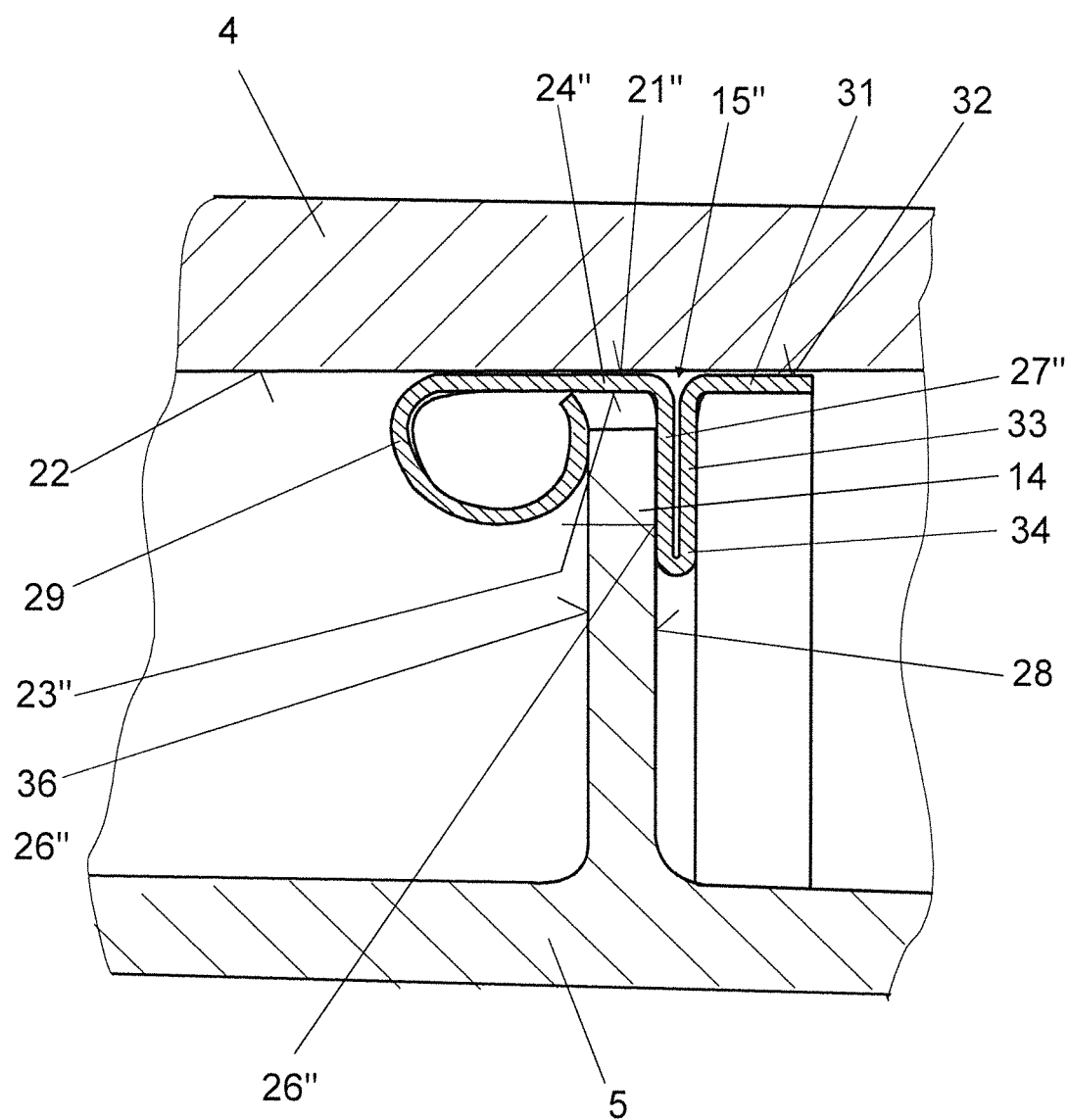
FIG. 8 an enlarged view of Detail VIII from FIG. 7.
Figure 9:
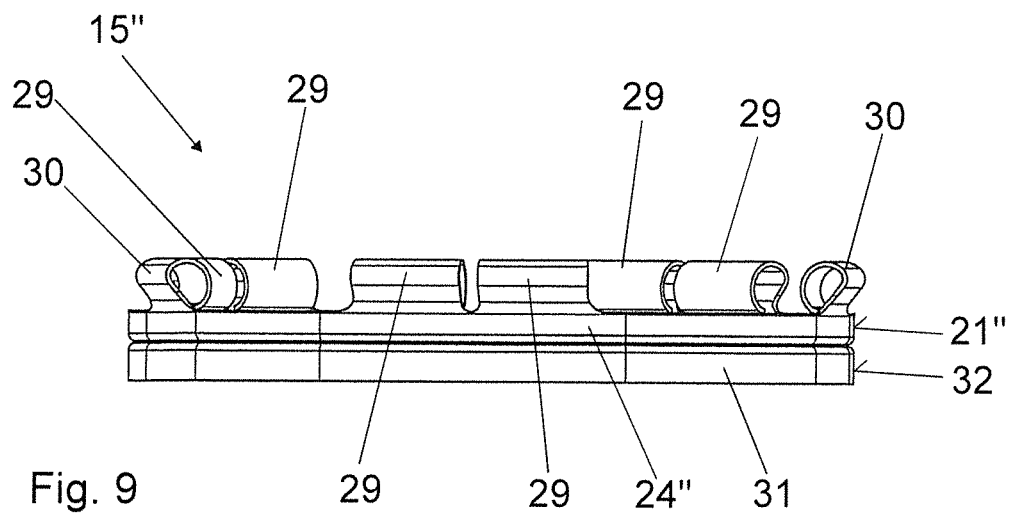
FIG. 9 a lateral view of the sealing ring from FIG. 7.
Figure 10:
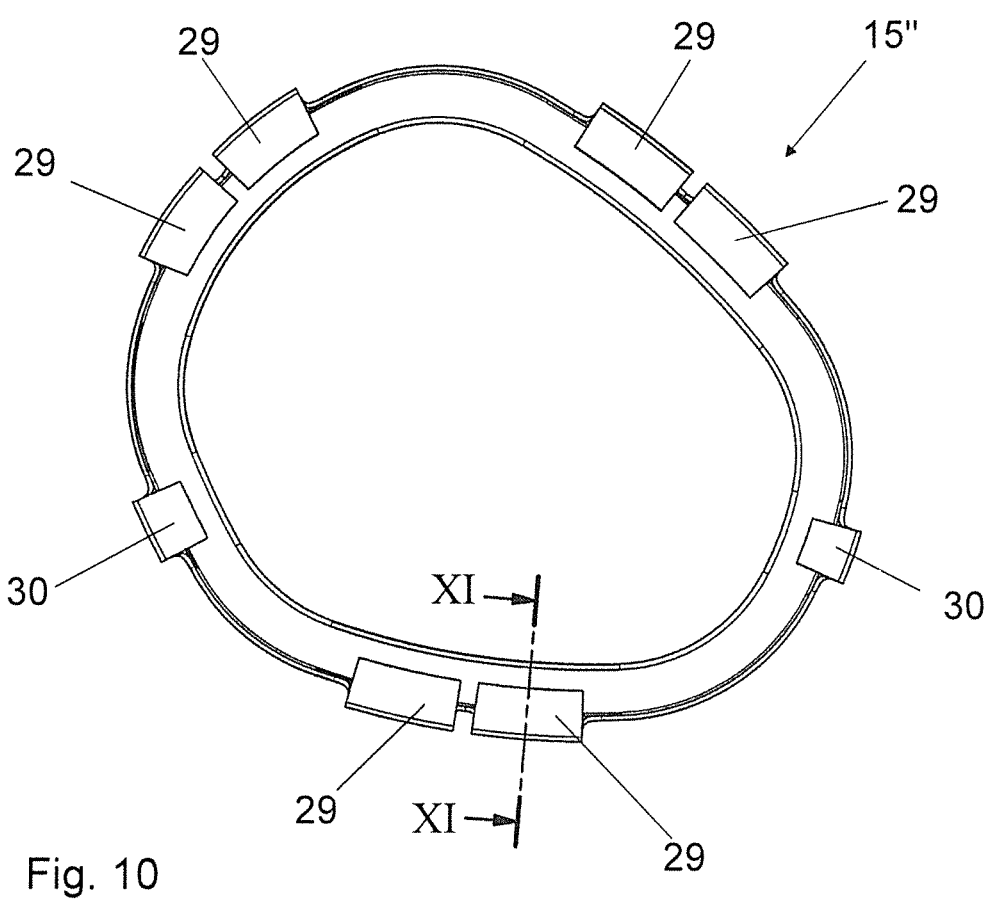
FIG. 10 a top view of the sealing ring from FIG. 9.
Figure 11:
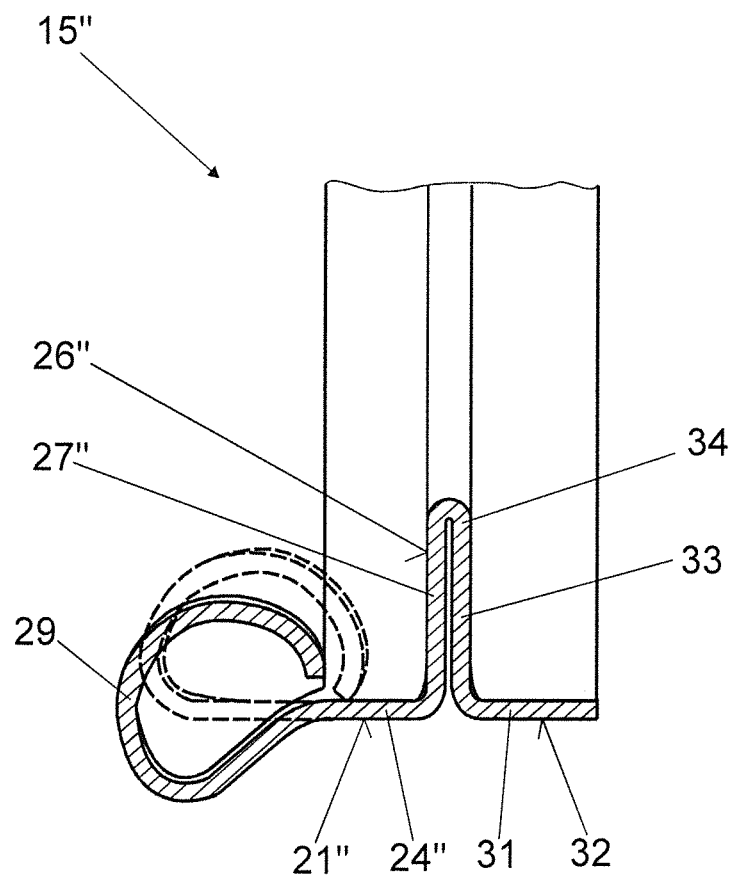
FIG. 11 an enlarged detail view of the sealing ring along Line XI-XI from FIG. 10 in its unmounted state, with the mounted state indicated by dotted lines.

According to the exemplary embodiment from FIG. 2 (Detail II from FIG. 1) and FIGS. 5-6, the sealing ring 15 is constructed as a ring cap that reaches over the collar 6 and with a peripherally extending outer lateral surface 21 lies under tension in a sealing manner against a wall surface 22 of the outer sleeve 4 adjacent to the free end 14 of the collar 6. With its inner lateral surface 23 facing away from the outer lateral surface 21, the jacket 24 of the ring cap lies under tension in a sealing manner against the end face 25 of the free end 14 of the collar 6. The elastic properties of the sealing ring 15, which is constructed from a wire mesh, enable the jacket 24 to seal the intermediate space between the free end 14 and the adjacent wall surface 22 of the outer sleeve 4. With an annular radial contact surface 26 of a ring wall 27 extending parallel to the radial collar 6, said ring wall merging into the jacket of the annular cap, the sealing ring 15 abuts a side surface 28 of the collar 6.

Figure 3:
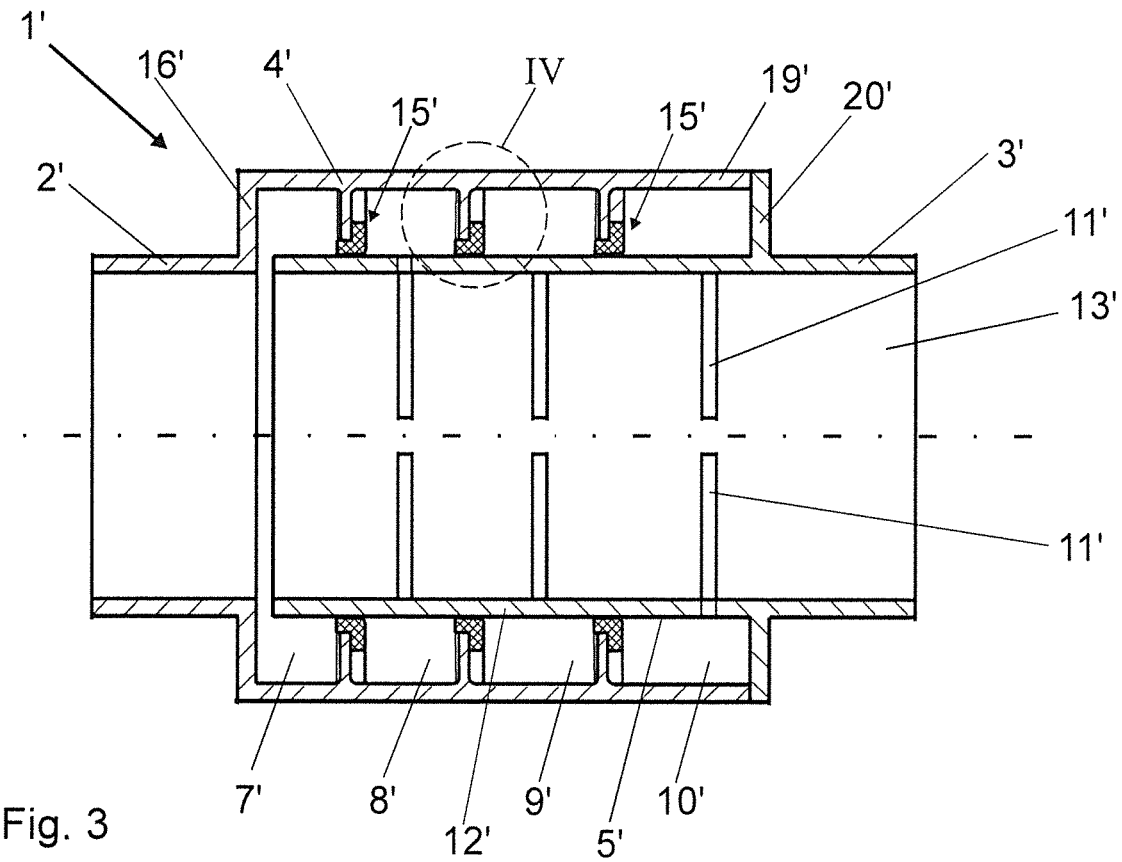
FIG. 3 a cross-sectional lateral view of a device for lowering flow noises, having an outer sleeve with integrally molded collars and with sealing rings made of a wire mesh that reach over the respective collar as a ring cap and an inner sleeve.
Figure 4:
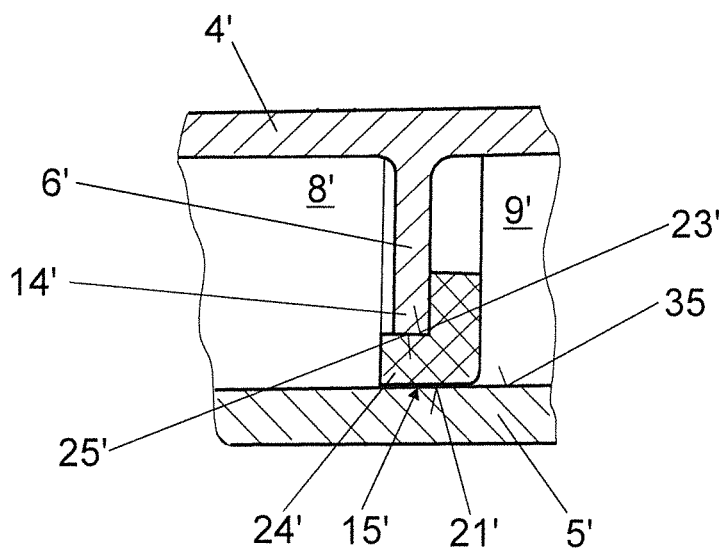
FIG. 4 an enlarged view of Detail IV from FIG. 3.

According to the device 1' of the exemplary embodiment from FIGS. 3 and 4 (Detail IV of FIG. 3), the peripherally extending radial collar 6' is securely arranged at the outer sleeve 4', by means of being integrally molded thereon, for example, and has at its free end 14' the sealing ring 15' made of the wire mesh for sealing against the inner sleeve 5'. Between the inner sleeve 5' and the outer sleeve 4' are arranged in each case two adjacent volume chambers 7', 8', 9', 10' separated from each other by a peripherally extending radial collar 6', said volume chambers being connected to the line space 13', which is enclosed by the inner sleeve 5', by means of openings 11' in the wall 12' of the inner sleeve 5'. At its end facing toward the second connection piece 3' the first connection piece 2' has a side wall 16' that laterally delimits the first volume chamber 7' toward the first connection piece 2', i.e. in the longitudinal direction, and in the exemplary embodiment it is connected to the outer sleeve 4' (although this is not obligatory). The outer sleeve 4' lies, with its second end 19' facing toward the second connection piece 3', against the side wall 20' of the connection piece 3'. The side wall 20' laterally delimits the volume chamber 10' toward the second connection piece 3', i.e. in the longitudinal direction, and is connected to the inner sleeve 5'. The sealing ring 15' lies, with its peripherally extending outer lateral surface 21', under tension in a sealing manner against the wall surface 35 of the outer sleeve 5' adjacent to the free end 14' of the collar 6' The jacket 24' of the ring cap lies, with its inner lateral surface 23' facing away from the outer lateral surface 21', under tension in a sealing manner against the end face 25' of the free end 14' of the collar 6'.

According to the exemplary embodiment in FIGS. 7 and 8 (Detail VIII of FIG. 7) and FIGS. 9-11, the sealing ring 15" of the device 1" is constructed as a resilient ring cap which reaches around the collar 6 and which, with a peripherally extending outer lateral surface 21" of the jacket 24", lies under tension in a sealing manner against the wall surface 22 of the outer sleeve 4 adjacent to the free end 14 of the collar 6. With an annular radial contact surface 26" of a ring wall 27" extending parallel to the radial collar 6, said ring wall merging into the jacket 24" of the ring cap, the sealing ring 15" lies under tension in a sealing manner against the side surface 28 of the collar 6 facing toward the ring wall 27"

The sealing ring 15" has, at its jacket 24" formed by the lateral surfaces 21" and 23", at its end facing away from the contact surface 26", a plurality of clamp profiles 29, 30 that in the mounted state lie under tension against the second side surface 35 of the collar 6 facing away from the side surface 28 and by means of which the contact surface 26" of the ring cap is placed under corresponding tension against the lateral surface 28 facing toward the contact surface 26".

The sealing ring 15" preferably has a second ring cap arranged with mirror symmetry (without clamp profiles) that has a second jacket 31 which, with its outer lateral surface 32, also lies under tension in a sealing manner against the wall surface 22. In the direction toward the ring wall 27", the second jacket 31 transitions into a second ring wall 33 that extends parallel to the first ring wall 27" and which at its end 34 facing away from the second jacket 31 transitions arcuately into the first ring wall 27".

Of course, the embodiments discussed in the specific description and shown in the figures are merely illustrative exemplary embodiments of the present invention. For example, the inlet and outlet, i.e. the flow direction, can be reversed. In addition to being applied to cylindrical cross-sections, the functional principle can also be used in connection with other cross-sectional shapes. In light of this disclosure, a person skilled in the art is given a wide range of possible variations.

LIST OF REFERENCE NUMBERS 1, 1', 1" Device
2, 2', first connection piece
3, 3' second connection piece
4, 4', outer sleeve
5, 5' inner sleeve
6, 6' collar
7, 7' volume chamber
8, 8' volume chamber
9, 9' volume chamber
10, 10' volume chamber
11, 11' opening
12 wall of 5

13, 13' line space of 5
14, 14' free end of 6
15, 15', 15" sealing ring
16, 16' side wall of 2
17 first end of 4
18 seal of 17
19, 19' second end of 4
20 side wall of 3
21, 21", outer lateral surface of 15
22 wall surface of 4
23, 23', 23" inner lateral surface of 15
24, 24', 24" jacket of 15
25, 25' end face of 14
26, 26" radial contact surface of 27
27, 27', 27" ring wall of 15
28 side surface of 6
29 clamp profile of 15"
30 clamp profile of 15"
31 second jacket of 15"
32 outer lateral surface of 31
33 second ring wall of von 15"
34 End of 33
35 wall surface of 5'
36 second side surface of 6

The invention claimed is:

1. A device (1, 1') for lowering flow noises, comprising a first connection piece (2, 2'), a second connection piece (3, 3') facing away from the first connection piece (2, 2'), an outer sleeve (4, 4') and an inner sleeve (5, 5') arranged between the first connection piece (2, 2') and the second connection piece (3, 3'), at least one peripherally extending radial collar (6, 6') arranged between the inner sleeve (5, 5') and the outer sleeve (4, 4') and defining at least two volume chambers (7, 7', 8, 8', 9, 9', 10, 10') separated from each other by the at least one radial collar (6, 6'), openings (11, 11') in a wall (12, 12') of the inner sleeve (5, 5') and connecting the volume chambers to a line space (13, 13') enclosed by the inner sleeve (5, 5'), and a sealing ring (15, 15') at a free end (14, 14') of the radial collar,
wherein
the sealing ring (15, 15') is a ring cap that reaches over the collar (6, 6') and lies against a wall surface (22, 35) of the sleeve (4, 4', 5, 5') adjacent to the free end (14, 14') of the collar (6, 6') in a sealing manner by means of a peripherally extending outer lateral surface (21, 21") of the ring cap, and
wherein
the ring cap lies under tension against the peripherally extending end face (25, 25') of the free end (14, 14') of the collar (6, 6') in a sealing manner by means of an inner lateral surface (23, 23") of the sealing ring facing away from the outer lateral surface (21, 21") or lies against the side surface (28) of the collar (6, 6') facing the ring cap in a sealing manner by means of an annular radial contact surface (26 extending parallel to the radial collar (6, 6'), and the sealing ring (15, 15') is constructed from a wire mesh, a mesh made of silicate fibers or a compound mesh made or wire and silicate fibers.

2. The device of claim 1,
wherein
the sealing ring (15, 15', 15") has elastic properties.

3. The device of claim 1,
wherein the peripherally extending radial collar (6) has a fixed end facing away from the free end (14), the fixed end is securely arranged at the inner sleeve (5) and the free end (14) is sealed against the outer sleeve (4) by means of the sealing ring (15).

4. The device of claim 1,
wherein
the peripherally extending radial collar (6') has a fixed end facing away from the free end (14'), the fixed end being securely arranged at the outer sleeve (4') and with the free end (14') being sealed against the inner sleeve (5') by means of the sealing ring (15').

5. The device of claim 1,
wherein
the sleeve (5, 4') connected to the fixed end of the collar (6, 6') and the collar (6, 6') are made of plastic.

6. The device of claim 1,
wherein
the sleeve (4, 5') that is not connected to the free end of the collar (6, 6') is made of metal.

7. A device (1) for lowering flow noises, comprising: a first connection piece (2), a second connection piece (3) facing away from the first connection piece (2), an outer sleeve (4) arranged between the first connection piece (2) and the second connection piece (3) and an inner sleeve (5) arranged between the first connection piece (2) and the second connection piece (3), at least two volume chambers (7, 8, 9, 10) arranged between the inner sleeve (5) and the outer sleeve (4) and separated from each other by at least one peripherally extending radial collar (6), the inner sleeve (5) having a wall (12) enclosing a line space (13), the wall (12) having openings (11) that connect the line space (13) to the volume chambers (7, 8, 9, 10), the radial collar (6) having a sealing ring (15") at a free end (14) of the radial collar (6), the sealing ring (15") being a ring cap that reaches over the radial collar (6) and lies against a wall surface (22) of the sleeve (4) opposed to the free end (14) of the radial collar (6) in a sealing manner by means of a peripherally extending outer lateral surface (21") of the ring cap,
wherein:
the sealing ring (15") has an annular radial contact surface (26") extending parallel to the radial collar (6) and lying under tension in a sealing manner against a first radial side surface (28) of the radial collar (6) facing toward the ring cap, and
wherein:
the sealing ring (15") has a jacket (24") with clamp profiles (29, 30) formed by lateral surfaces (21", 23") at an end facing away from the annular radial contact surface (26"), the clamp profiles (29, 30), in a mounted state, abut under tension with a second radial side surface (36) of the collar (6) facing away from the first radial side surface (28), and the contact surface (26") of the ring cap being tensioned with corresponding tension against the first radial side surface (28) facing toward the contact surface (26").

8. The device of claim 7,
wherein
the sealing ring (15") is constructed of a resilient stainless steel.

9. The device of claim 7,
wherein
the peripherally extending radial collar (6) has a fixed end facing away from the free end (14), the fixed end is securely arranged at the inner sleeve (5) and the free end (14) is sealed against the outer sleeve (4) by means of the sealing ring (15").

10. The device of claim 7,
wherein
the peripherally extending radial collar has a fixed end facing away from the free end, the fixed end being securely arranged at the outer sleeve and with the free end being sealed against the inner sleeve by means of the sealing ring.

11. The device of claim 7,
wherein
the sleeve (5) connected to the fixed end of the collar (6) and the collar (6) are made of plastic.

12. The device of claim 7,
wherein
the sleeve (4) that is not connected to the fixed end of the collar (6'33333333333) is made of aluminum or metal.

\* \* \* \* \*